(12) United States Patent
Cui et al.

(10) Patent No.: US 12,063,539 B2
(45) Date of Patent: Aug. 13, 2024

(54) MEASUREMENT PERIOD EXTENSION WITH smtc2-LP IN IDLE AND INACTIVE RADIO RESOURCE MANAGEMENT

(71) Applicant: APPLE INC., Cupertino, CA (US)

(72) Inventors: Jie Cui, Cupertino, CA (US); Yushu Zhang, Beijing (CN); Dawei Zhang, Cupertino, CA (US); Haitong Sun, Cupertino, CA (US); Hong He, Cupertino, CA (US); Manasa Raghavan, Cupertino, CA (US); Yang Tang, Cupertino, CA (US); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 392 days.

(21) Appl. No.: 17/593,708

(22) PCT Filed: Apr. 14, 2021

(86) PCT No.: PCT/CN2021/087172
§ 371 (c)(1),
(2) Date: Sep. 23, 2021

(87) PCT Pub. No.: WO2022/021943
PCT Pub. Date: Feb. 3, 2022

(65) Prior Publication Data
US 2022/0312247 A1    Sep. 29, 2022

(30) Foreign Application Priority Data

Jul. 29, 2020    (WO) ................ PCT/CN2020/105467

(51) Int. Cl.
*H04W 24/10*    (2009.01)
(52) U.S. Cl.
CPC .................................. *H04W 24/10* (2013.01)

(58) Field of Classification Search
CPC . H04W 24/10; H04W 48/12; H04W 36/0072; H04W 36/0088; H04W 36/08;
(Continued)

(56) References Cited

U.S. PATENT DOCUMENTS 11,330,453 B2 *   5/2022   da Silva ................ H04W 48/16
11,490,283 B2 *  11/2022   Yang ..................... H04L 5/0057
(Continued)

FOREIGN PATENT DOCUMENTS

CN      111132184 A     5/2020
WO      2018164515 A1   9/2018

OTHER PUBLICATIONS

OPPO, "Open issues for early measurement", R2-2004389, 3GPP TSG-RAN WG2 Meeting #110, Electronic, Agenda Item 6.10.4.3, Jun. 1-12, 2020, 2 pages.
OPPO, ZTE, CMCC, "Additional SSB-ToMeasure for smtc2-LP", R2-2004388, 3GPP TSG-RAN WG2 Meeting #110, Electronic, Agenda Item 6.20.1.3, Jun. 1-Jun. 12, 2020, 9 pages.
PCT/CN2021/087172, International Search Report and Written Opinion, Jul. 21, 2021, 9 pages.
(Continued)

*Primary Examiner* — Brian T O Connor
(74) *Attorney, Agent, or Firm* — Dorsey & Whitney LLP

(57)    ABSTRACT

Apparatuses, systems, and methods may use an smtc information element or an smtc2-LP information element to calculate timing of a first measurement period to evaluate a serving cell while the UE is in idle mode or inactive mode. Additionally, apparatuses, systems, and methods may use the smtc information element or the smtc2-LP information element to calculate timing of a second measurement period to evaluate intra-frequency cells while the UE is in idle mode or inactive mode.

20 Claims, 6 Drawing Sheets

(58) Field of Classification Search
CPC ...... H04W 48/16; H04B 17/318; H04L 5/005; Y02D 30/70
See application file for complete search history.

(56) References Cited

U.S. PATENT DOCUMENTS

| | | | |
|---|---|---|---|
| 11,799,534 B2* | 10/2023 | da Silva | H04B 7/0626 |
| 2018/0324678 A1 | 11/2018 | Chen et al. | |
| 2020/0374735 A1* | 11/2020 | Wei | H04L 5/0091 |
| 2022/0007293 A1* | 1/2022 | Kaikkonen | H04W 52/0251 |
| 2022/0353722 A1* | 11/2022 | Koskela | H04W 24/10 |
| 2022/0360310 A1* | 11/2022 | da Silva | H04B 7/0632 |
| 2023/0180072 A1* | 6/2023 | Ranjan | H04W 48/18 455/436 |
| 2023/0284060 A1* | 9/2023 | Euler | H04W 24/10 370/329 |

OTHER PUBLICATIONS

Apple, "CR on R16 IDLE/INACTIVE RRM requirement with SMTC2-LP", R4-2014281, 3GPP TSG-RAN4 Meeting #97-e. Online, Change Request 38.133 CR 1150, current version 16.5.0, Nov. 2-13, 2020, 5 pages.

Apple, Intel, "Motivation paper on REL-17 RRM further enhancement (NR_feRRM)", RP-201100, 3GPP TSG-RAN Meeting #88e, Online, Agenda Item 9.1.2, Jun. 29-Jul. 3, 2020, 15 pages.

Ericsson, "Discussions on serving cell requirements for NR-U standalone", R4-1909483, 3GPP TSG-RAN WG4 Meeting #92, Ljubljana, Slovenia, Agenda Item 9.1.5.1, Aug. 26-30, 2019, 4 pages.

Orange, AT&T, Vodafone, "Introduction of multiple SMTCs per frequency carrier in idle mode", R2-1910673, 3GPP TSG-RAN WG2 Meeting #107, Prague, Czech Republic, Change Request 38.331, CR 1218, Current version 15.6.0, Aug. 26-30, 2019, 11 pages.

* cited by examiner

MEASUREMENT PERIOD EXTENSION WITH smtc2-LP IN IDLE AND INACTIVE RADIO RESOURCE MANAGEMENT

TECHNICAL FIELD

This application relates generally to wireless communication systems, including determining measurement timing in idle and inactive modes.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LIE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node. NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency hands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

One goal in network communications is to reduce power consumption. For example, in Radio Resource Control (RRC) connected mode, network configurations for a user equipment (UE) can use two types of Synchronization Signal Block (SSB)) based Measurement Timing Configurations (SMTC) (i.e., smtc1 and smtc2) to configure a UE to perform measurements of network cells in different ways. Smtc1 may be a legacy configuration that is configured to cause the UE to enable cell detection and measurement on a certain frequency layer. Smtc2 in RRC connected mode may be used by the network to speed up the measurement thereby reducing measurement time and power consumed.

While the smtc2 is used to improve power consumption of the UE in RRC connected mode over the legacy smtc1, there is no current mechanism of using a new smtc to improve power consumption in idle and inactive modes. Embodiments described herein use smtc2 in idle and inactive modes. The embodiments provide methods to incorporate smtc2 to determine a measurement delay or measurement period in idle and inactive modes. The smtc2 may be used to relax the measurement delay or in other words increase the amount of time between when the UE should perform the cell measurement and evaluation. As the measurement period is extended, the UE consumes less power. Further, the relaxed measurement delay may reduce network power consumption because the reduced measurements from the UE means that the network may not transmit measurement signals as frequently.

With two types of SMTCs, embodiments herein describe when a UE should use smtc1 (a legacy configuration) and when a UE should use smtc2 (a new power saving configuration) to determine measurement delay or measurement period in idle and inactive modes. More specifically, in some embodiments the smtc2 is an smtc2-long period (LP) and embodiments describe the UE behavior for the measurement in idle and inactive mode to accommodate the smtc2-1p.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Figure 1:
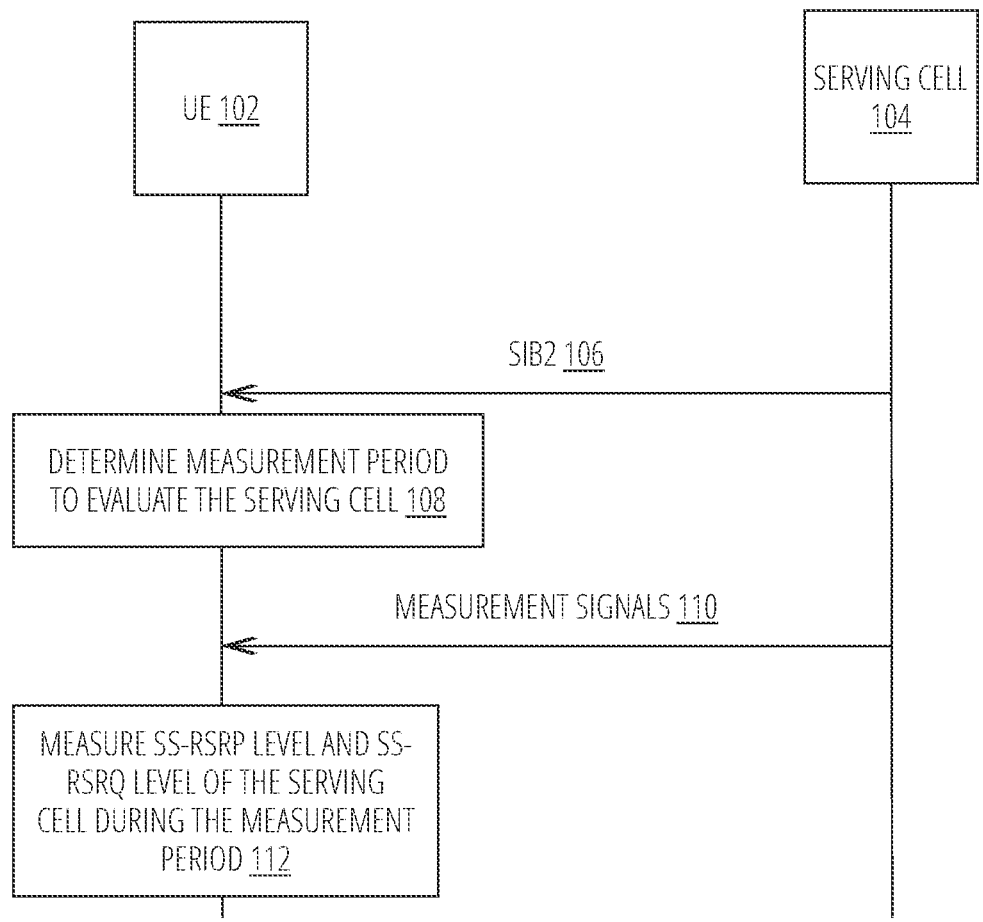
FIG. 1 is a simplified signal flow diagram of an example procedure for determining a measurement period and measurement period extension with SMTC2-LP in idle and inactive radio resource management modes.

FIG. 1 is a simplified signal flow diagram of an example procedure for determining a measurement period for a serving cell 104 with SMTC2-LP in idle and inactive radio resource management modes. The UE 102 may select the serving cell 104 for network communication. The UE 102 may monitor the serving cell and intra-frequency cells to determine if re-selection should occur.

After cell selection has initially occurred, a UE, 102 receives system information blocks (e.g., SIB2 106) from a serving cell 104. The SIB2 106 comprises information that the UE 102 may use to configure itself. Specifically related to the embodiments described herein, the SIB2 106 may include one or both of an smtc information element and an SMTC2-LP information element in an intraFreqCellReselectionInfo information element. The smtc information element may comprise measurement timing configuration for intra-frequency measurement.

The SMTC2-LP information element can be configured to an intra-frequency and/or an inter-frequency. The smtc2-LP IE consists of two parts: (1) PCI list; and (2) periodicity of this smtc2-LP. The smtc2-LP may comprise measurement timing configuration for intra-frequency neighbor cells with a Long Periodicity (LP) indicated by periodicity in smtc2-LP. The timing offset and duration may equal to the offset and duration indicated in the smtc information element in the intraFreqCellReselectionInfo information element. The periodicity in smtc2-LP information element can be set to a value larger than the periodicity in the smtc information element in the intraFreqCellReselectionInfo information element (e.g. if smtc indicates sf20 the Long Periodicity can be set to sf40, sf80 or sf160, if smtc indicates sf160, smtc2-LP cannot be configured). The pci-List, if present, includes the physical cell identities of the intra-frequency neighbor cells with Long Periodicity. If smtc2-LP is absent, the UE can assume that there are no intra-frequency neighbor cells with a Long Periodicity.

The UE 102 may use the SIB2 106 to configure itself. For example, the UE 102 may use the smtc information element or the SMTC2-LP information element to determine 108 timing of a measurement period (e.g., a measurement period extension) of the serving cell 104 when the UE 102 is in idle or inactive mode. The measurement period extension may be the number of Discontinuous Reception (DRX) cycles between each serving cell measurement period while the UE 102 is in idle or inactive mode. The number of DRX cycles may be dependent on the smtc information element or the SMTC2-LP information element. The following embodiments provide UE behavior of period extension for serving cell evaluation in IDLE and inactive modes. The UE 102 may use any of the embodiments to determine 108 the timing of the measurement period to evaluate the serving cell 104.

In a first embodiment, the UE 102 measures the Synchronization Signal based Reference Signal Received Power (SS-RSRP) level and the Synchronization Signal based Reference Signal Received Quality (SS-RSRQ) level of the serving cell 104 and evaluates the cell selection criterion for the serving cell at least once every M1*N1 DRX cycle; where:

M1=2, if SMTC periodicity ($T_{SMTC}$)>20 ms and DRX cycle≤0.64 second, otherwise M1=1, where $T_{SMTC}$ is the periodicity of the SMTC occasion configured for the intra-frequency carrier. If the UE 102 has been provided with system information of smtc2-LP on this intra-frequency carrier, $T_{SMTC}$ follows smtc2-1p; otherwise $T_{SMTC}$ period follows smtc in intraFreqCellReselectionInfo in SIB2.

In this first embodiment, the $T_{SMTC}$ is based on whether the smtc2-LP information element was received or not. If the smtc2-LP information element was received, the UE 102 favors the smtc2-LP information element over the smtc information element and use the smtc2-LP information element to determine the number of DRX cycles for the measurement and evaluation period for the serving cell 104.

N1 is a scaling factor that may be determined according to table 1.

TABLE 1

| | $N_{serv}$ | | |
|---|---|---|---|
| DRX cycle | Scaling Factor (N1) | | $N_{serv}$ [number of |
| length [s] | FR1 | FR2$^{Note1}$ | DRX cycles] |
| 0.32 | 1 | 8 | M1*N1*4 |
| 0.64 | | 5 | M1*N1*4 |
| 1.28 | | 4 | N1*2 |
| 2.56 | | 3 | N1*2 |

Note1:
Applies for UE supporting power class 2&3&4. For UE supporting power class 1, N1 = 8 for all DRX cycle length.

In a second embodiment, the UE 102 measures the SS-RSRP level and the SS-RSRQ level of the serving cell 104 and evaluates the cell selection criterion for the serving cell at least once every M1*N1 DRX cycle; where:

M1=2, if $T_{SMTC}$>20 ms and DRX cycle≤0.64 second, otherwise M1=1, where $T_{SMTC}$ is the periodicity of the SMTC occasion configured for the intra-frequency carrier. No matter whether UE 102 has been provided with system information of smtc2-LP on this intra-frequency carrier or not, $T_{SMTC}$ period follows smtc in intraFreqCellReselectionInfo in SIB2.

In this second embodiment, the UE 102 always uses smtc information element to determine the $T_{SMTC}$. In other words, the UE 102 always uses the smtc information element to determine the number of DRX cycles for the measurement and evaluation period for the serving cell 104.

N1 is a scaling factor that may be determined according to table 1.

In a third embodiment, the UE 102 measures the SS-RSRP level and the SS-RSRQ level of the serving cell 104 and evaluates the cell selection criterion for the serving cell at least once every M1*N1 DRX cycle; where:

M1=2, if $T_{SMTC}$>20 ms and DRX cycle≤0.64 second, otherwise M1=1;

where $T_{SMTC}$ is the periodicity of the SMTC occasion configured for the intra-frequency carrier. If the UE 102 has been provided with system information of smtc2-LP on this intra-frequency carrier and the serving cell 104 is in the pci-List of this smtc2-LP, $T_{SMTC}$ follows smtc2-LP; otherwise $T_{SMTC}$ period follows smtc in intraFreqCellReselectioninfo in SIB2.

In this third embodiment, the UE 102 checks that both the intra-frequency carrier and the serving cell 104 are included in the smtc2-LP information element. If the UE 102 determines that the smtc2-LP information element includes the intra-frequency carrier and the serving cell, the UE 102 uses the smtc2-LP information element to determine the number of DRX cycles for the measurement and evaluation period for the serving cell. However, if the LT 102 determines that the smtc2-LP information element is lacking one or both of the intra-frequency carrier and the serving cell, the UE 102 uses smtc information element to determine the number of DRX cycles for the measurement and evaluation period for the serving cell 104.

N1 is a scaling factor that may be determined according to table 1.

In a fourth embodiment, the UE 102 measures the SS-RSRP level and the SS-RSRQ level of the serving cell 104 and evaluates the cell selection criterion for the serving cell at least once every M1*N1 DRX cycle; where:

M1=2, if $T_{SMTC}$>20 ins and DRX cycle≤0.64 second, otherwise M1=1, where $T_{SMTC}$ is the periodicity of the SMTC occasion configured for the intra-frequency carrier. If the UE has been provided with system information of smtc2-LP on this intra-frequency carrier and at least one intra-frequency cell is in the pci-List of this smtc2-LP, $T_{SMTC}$ follows smtc2-LP; otherwise $T_{SMTC}$ period follows smtc in intraFreqCellReselectioninfo in SIB2, In this fourth embodiment, the UE 102 checks that both the intra-frequency carrier and at least one intra-frequency cell are included in the smtc2-LP information element. If the UE 102 determines that the smtc2-LP information element includes the intra-frequency carrier and at least one intra-frequency cell, the UE 102 uses the smtc2-LP information element to determine the number of DRX cycles for the measurement and evaluation period for the serving cell. However, if the UE 102 determines that the smtc2-LP information element is lacking one or both of the intra-frequency carrier and the at least one intra-frequency cell, the UE 102 uses site information element to determine the number of DRX cycles for the measurement and evaluation period for the serving cell 104.

N1 is a scaling factor that may be determined according to table 1.

The serving cell 104 may time when the measurement signals 110 are transmitted based on the smtc information element or the smtc2-LP information element according to which of the above embodiments the UE 102 is employing to determine 108 the timing of the measurement period. The UE 102 measures 112 signal power level (e.g., the SS-RSRP level and SS-RSRQ level of the serving cell 104) during the measurement period.

Figure 2:
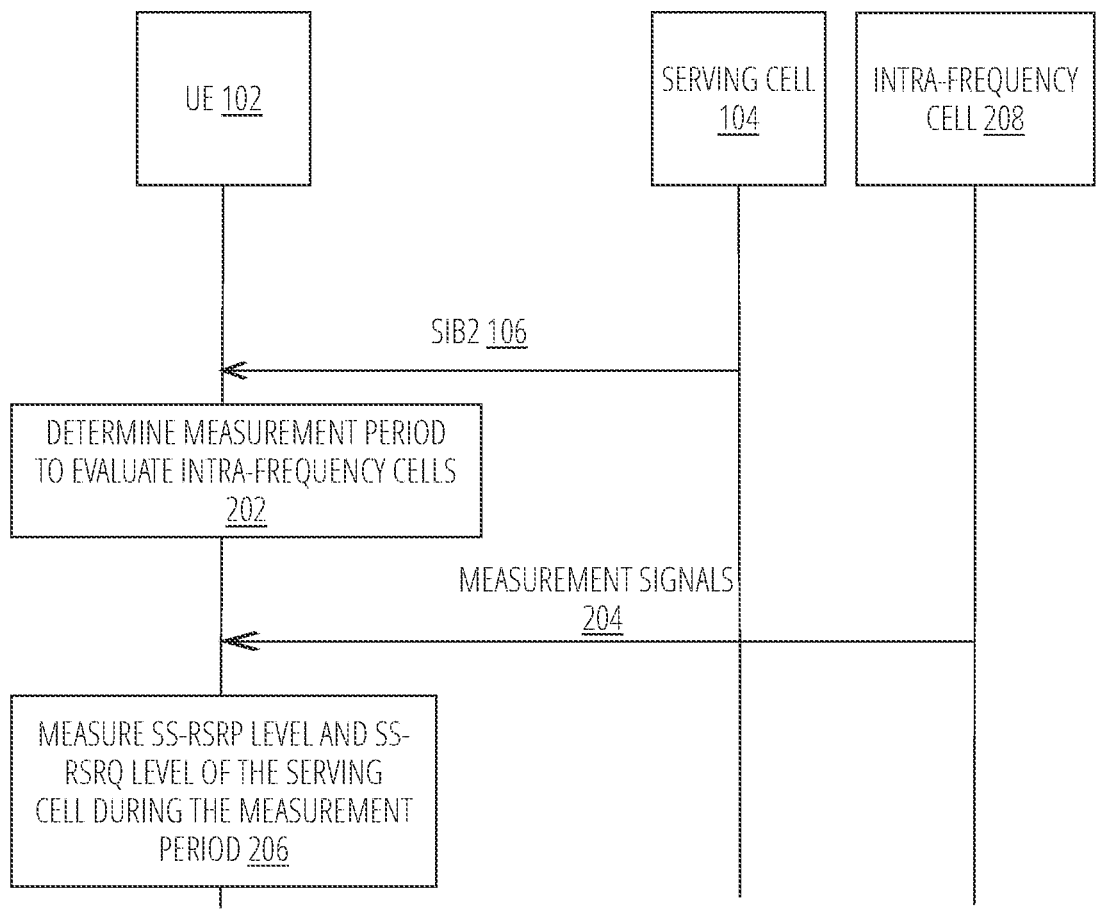
FIG. 2 illustrates an aspect of the subject matter in accordance with one embodiment.

FIG. 2 is a simplified signal flow diagram of an example procedure for determining a measurement period for an intra-frequency cell 208 with SMTC2-LP in idle and inactive radio resource management modes. The UE 102 may select the serving cell 104 for network communication. The UE 102 may monitor the serving cell 104 and intra-frequency cells (e.g., intra-frequency cell 208) to determine if re-selection should occur.

The embodiments described with reference to FIG. 2 may be used in combination with any embodiment described with reference to FIG. 1. FIG. 1 describes several methods for the UE 102 to determine the timing of a measurement period to evaluate a serving cell whereas the disclosure related to FIG. 2 describes several methods for the UE 102 to determine the timing of a measurement period to evaluate intra-frequency cells. To determine if re-selection should occur, the UE 102 evaluates the serving cell as well as intra-frequency cells. Thus, the UE 102 may determine a measurement period for the serving cell 104 and the intra-frequency cell 208 in idle and inactive modes.

After cell selection has initially occurred, the UE 102 receives system information blocks (e.g., S1B2 106) from a serving cell 104. The S1B2 106 comprises information that the UE 102 may use to configure itself. Specifically related to the embodiments described herein, the SIB2 106 may include one or both of an smtc information element and an SMTC2-LP information element in an intraFreqCellReselectioninfo information element. The snits; information element may comprise measurement timing configuration for intra-frequency measurement. The SMTC2-LP information element can be configured to an intra-frequency and/or an inter-frequency. The smtc2-LP IE consists of two parts: (1) PCI list; and (2) periodicity of this smtc2-LP.

The following embodiments provide UE behavior of period extension for intra-frequency cell evaluation in IDLE and Inactive modes. The UE 102 may use any of the embodiments to determine 202 the timing of the measurement period to evaluate the intra-frequency cell 208.

In inactive and idle modes, the UE 102 may measure the SS-RSRP and SS-RSRQ level of the intra-frequency cell 208 at least every $T_{measure,NR\_Intra}$ (see table 2) for intra-frequency cells that are identified and measured according to a set of measurement rules.

TABLE 2

$T_{detect, NR\_Intra}$, $T_{measure, NR\_Intra}$ and $T_{evaluate, NR\_Intra}$

| DRX cycle length [s] | Scaling Factor (N1) FR1 | Scaling Factor (N1) FR2[Note1] | $T_{detect, NR\_Intra}$ [s] (number of DRX cycles) | $T_{measure, NR\_Intra}$ [s] (number of DRX cycles) | $T_{evaluate, NR\_Intra}$ [s] (number of DRX cycles) |
|---|---|---|---|---|---|
| 0.32 | 1 | 8 | 11.52 × N1 × M2 (36 × N1 × M2) | 1.28 × N1 × M2 (4 × N1 × M2) | 5.12 × N1 × M2 (16 × N1 × M2) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N 1) | 6.4 × N1 (5 × N1) |
| 2.56 | | 3 | 58.88 × N1 (23 × N1) | 2.56 × N1 (1 × N1) | 7.68 × N1 (3 × N1) |

Note1:
Applies for UE supporting power class 2&3&4. For UE supporting power class 1, N1 = 8 for all DRX cycle length.
Note 2:
M2 = 1.5 if SMTC periodicity of measured intra-frequency cell > 20 ms; otherwise M2 = 1.

In a first embodiment, the UE 102 measures the SS-RSRP level and the SS-RSRQ level of the intra-frequency cell 208 and evaluates the cell selection criterion for the serving cell at least once every $T_{measure,NR\_intra}$ (see table 2). As shown in table 2, the measurement period, detection period, and evaluation period for intra-frequency cell may be scaled by a scaling factor M2, where:

M2=1.5,
if SMTC periodicity of measured intra-frequency cell ($T_{SMTC}$)>20 ms and DRX cycle length=320 ms, otherwise M2=1.

In this first embodiment, $T_{SMTC}$ is the periodicity of the SMTC occasion configured for the intra-frequency carrier, if the UE has been provided with system information of smtc2-LP on this intra-frequency carrier, $T_{SMTC}$ follows smtc2-1p; otherwise $T_{SMTC}$ period follows smtc in intraFreqCellReselectionInfo in SIB2.

In other words, the $T_{SMTC}$ is based on whether the smtc2-LP information element was received or not. If the smtc2-LP information element was received, the UE favors the smtc2-LP information element over the smtc information element and uses the smtc2-LP information element to determine the number of DRX cycles for the measurement and evaluation period for the intra-frequency cell 208.

In a second embodiment, the UE 102 measures the SS-RSRP level and the SS-RSRQ level of the intra-frequency cell 208 and evaluates the cell selection criterion for the serving cell at least once every $T_{measure,NR\_Intra}$ (see table 2). As shown in table 2, the measurement period, detection period, and evaluation period for intra-frequency cell may be scaled by a scaling factor M2, where:

M2=1.5, if $T_{SMTC}$>20 ms and DRX cycle length=320 ms, otherwise M2=1.

In this second embodiment, $T_{SMTC}$ is the periodicity of the SMTC occasion configured for the intra-frequency carrier. No matter whether UE has been provided with system information of smtc2-LP on this intra-frequency carrier or not, $T_{SMTC}$ period follows smtc in IntraFreqCellReselectionInfo in SIB2.

In other words, the UE 102 always uses smtc information element to determine the $T_{SMTC}$. In other words, the UE 102 always uses the smtc information element to determine the number of DRX cycles for the measurement and evaluation period for the intra-frequency cell 208.

In a third embodiment, the UE 102 measures the SS-RSRP level and the SS-RSRQ level of the intra-frequency cell 208 and evaluates the cell selection criterion for the serving cell at least once every $T_{measure,NR\_Intra}$ (see table 2). As shown in table 2, the measurement period, detection period, and evaluation period for intra-frequency cell may be scaled by a scaling factor M2, where:

M2=15, if $T_{SMTC}$>20 ins and DRX cycle length=320 ms, otherwise M2=1.

In this third embodiment, $T_{SMTC}$ is the periodicity of the SMTC occasion configured for the intra-frequency carrier. If the UE has been provided with system information of smtc2-LP on this intra-frequency carrier and target intra-frequency cell is in the pci-List of this smtc2-LP, $T_{SMTC}$ follows smtc2-LP, otherwise $T_{SMTC}$ period follows smtc in intraFreqCellReselectionInfo in SIB2.

In other words, the UE 102 checks that both the intra-frequency carrier and at least one intra-frequency cell are included in the smtc2-LP information element. If the UE 102 determines that the smtc2-LP information element includes the intra-frequency carrier and the intra-frequency cell 208, the UE 102 uses the smtc2-LP information element to determine the number of DRX cycles for the measurement and evaluation period for the serving cell. However, if the UE 102 determines that the smtc2-LP information element is lacking one or both of the intra-frequency carrier and the intra-frequency cell 208, the UE 102 uses smtc information element to determine the number of DRX cycles for the measurement and evaluation period for the serving cell 104.

The serving cell 104 may time when the measurement signals 204 are transmitted based on the smtc information element or the smtc2-LP information element according to which of the above embodiments the UE 102 is employing to determine 202 the timing of the measurement period. The UE 102 measures 206 a signal power level (e.g., the SS-RSRP level and SS-RSRQ level of the intra-frequency cell 208) during the measurement period.

Figure 3:
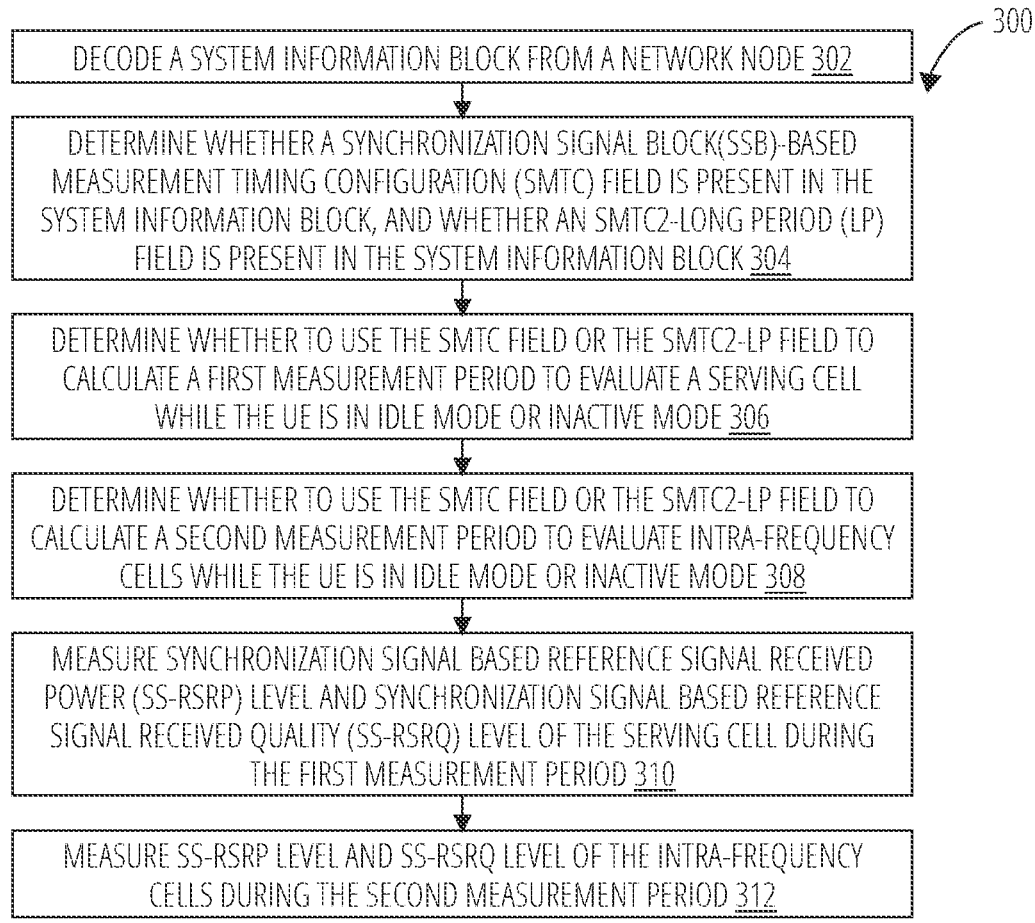
FIG. 3 illustrates a method in accordance with one embodiment.

FIG. 3 is a block diagram of a method 300 for a UE to measure SS-RSRP level and SS-RSRQ level of serving cells and intra-frequency cells in idle and inactive modes. In block 302, method 300 decodes a system information block from a network node. In block 304, method 300 determines whether a Synchronization Signal Block (SSB)-based Measurement Timing Configuration (smtc) information element is present in the system information block, and whether an smtc2-long period (LP) information element is present in the system information block.

In block 306, method 300 determines whether to use the smtc information element or the smtc2-LP information element to calculate a first measurement period to evaluate a serving cell while the UE is in idle mode or inactive mode. The UE may use any of the embodiments described with reference to FIG. 1 to determine whether to use the smtc information element or the smtc2-LP information element to calculate a first measurement period.

In block 308, method 300 determines whether to use the smtc information element or the smtc2-LP information element to calculate a second measurement period to evaluate intra-frequency cells while the UE is in idle mode or inactive mode. The UE may use any of the embodiments described with reference to FIG. 2 to determine whether to use the smtc information element or the smtc2-LP information element to calculate a second measurement period.

In block 310, method 300 measures Synchronization Signal based Reference Signal Received Power (SS-RSRP) level and Synchronization Signal based Reference Signal Received Quality (SS-RSRQ) level of the serving cell during the first measurement period. In block 312, method 300 measures SS-RSRP level and SS-RSRQ level of the intra-frequency cells during the second measurement period.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions, Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 4:
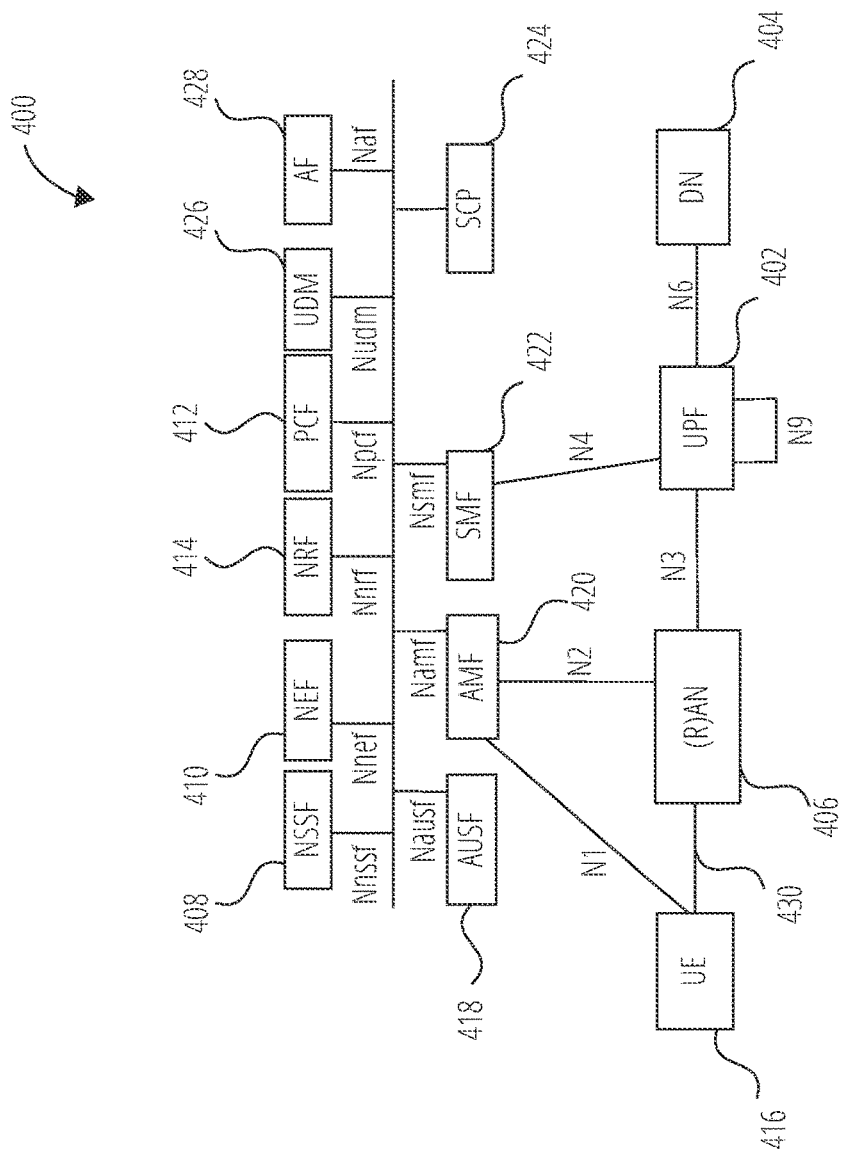
FIG. 4 illustrates an example service based architecture 400 in accordance with certain embodiments.

FIG. 4 illustrates a service based architecture 400 in 5GS according to one embodiment. As described in 3GPP TS 23,501, the service based architecture 400 comprises NFs such as an NSSF 408, a NEF 410, an NRF 414, a PCF 412, a UDM 426, an AUSF 418, an AMF 420, an SMF 422, for communication with a UE 416, a (R)AN 406, a UPF 402, and a DN 404. The NFs and NF services can communicate directly, referred to as Direct Communication, or indirectly via a SCP 424, referred to as Indirect Communication. FIG. 4 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 4 are described below.

The NSSF 408 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate. AMF(s), possibly by querying the NRF.

The NEF 410 supports exposure of capabilities and events. NF capabilities and events may be securely exposed by the NEF 410 (e.g., for 3rd party, Application Functions, and/or Edge Computing). The NEF 410 may store/retrieve information as structured data using a standardized interface (Nudr) to a UDR. The NEF 410 may also secure provision of information from an external application to 3GPP network and may provide for the Application Functions to securely provide information to the 3GPP network (e.g., expected UE behavior, 5GLAN group information, and service specific information), wherein the NEF 410 may authenticate and authorize and assist in throttling the Application Functions. The NEF 410 may provide translation of internal-external information by translating between information exchanged with the AF and information exchanged with the internal network function. For example, the NEF 410 translates between an AF-Service-Identifier and internal 5G Core information such as DNN and S-NSSAI. The NEF 410 may handle masking of network and user sensitive information to external AF's according to the network policy. The NEF 410 may receive information from other network functions (based on exposed capabilities of other network functions), and stores the received information as structured data using a standardized interface to a UDR. The stored information can be accessed and re-exposed by the NEF 410 to other network functions and Application Functions, and used for other purposes such as analytics. For external exposure of services related to specific UE(s), the NEF 410 may reside in the HPLMN. Depending on operator agreements, the NEF 410 in the HPLMN may have interface(s) with NF(s) in the \TIAN. When a UE is capable of switching between EPC and 5GC, an SCEF+NEF may be used for service exposure.

The NRF 414 supports service discovery function by receiving an NF Discovery Request from an NF instance or SCP and providing the information of the discovered NF instances to the NF instance or SCP. The NRF 414 may also support P-CSCF discovery (specialized case of AF discovery by SMF), maintains the NF profile of available NF instances and their supported services, and/or notify about newly registered/updated/deregistered. NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NIA's may be deployed in the different networks, wherein the NRF(s) in the Visited. PLMN (known as the vNRF) are configured with information for the visited PLAN, and wherein the NRF(s) in the Home PLMN (known as the hNRF) are configured with information for the home PLMN, referenced by the vNRF via an N27 interface.

The PCF 412 supports a unified policy framework to govern network behavior. The PCF 412 provides policy rules to Control Plane function(s) to enforce them. The PCF 412 accesses subscription information relevant for policy decisions in a Unified Data Repository (UDR). The PCF 412 may access the UDR located in the same PLMN as the PCF.

The UDM 426 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data e.g., roaming restrictions), UE's Serving NF Registration Management (e.g., storing serving ANIF for UE, storing serving SMF for UE's PDU Session), service/session continuity (e.g., by keeping SMF/DNN assignment of ongoing sessions. MT-SMS delivery, Lawful Intercept Functionality (especially in outbound roaming cases where a UDM is the only point of contact for LI), subscription management. SMS management, 5GLAN group management handling, and/or external parameter provisioning (Expected UE Behavior parameters or Network Configuration parameters). To provide such functionality, the UDM 426 uses subscription data (including authentication data) that may be stored in a UDR, in which case a UDM implements the application logic and may not require an internal user data storage and several different UDMs may serve the same user in different transactions. The UDM 426 may be located in the HPLMN of the subscribers it serves, and may access the information of the UDR located in the same PLMN.

The AF 428 interacts with the Core Network to provide services that, for example, support the following: application influence on traffic routing; accessing the NEF 410; interacting with the Policy framework for policy control; and/or MIS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 410 to interact with relevant Network Functions.

The AUSF 418 supports authentication for 3GPP access and untrusted non-3 GPP access. The AUSF 418 may also provide support for Network Slice-Specific Authentication and Authorization.

The AMF 420 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected. UE Behavior parameters or Network Configuration parameters), and/or Network Slice-Specific Authentication and Authorization. Some or all of the ANIF functionalities may be supported in a single instance of the AMF 420. Regardless of the number of Network functions, in certain embodiments there is only one NAS interface instance per access network between the UE and the CN, terminated at one of the Network functions that implements at least NAS security and Mobility Management. The AMF 420 may also include policy related functionalities.

In addition to the functionalities described above, the AMF 420 may include the following functionality to support non-3GPP access networks: support of N2 interface with N3IWF/TNGF, over which some information e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3 GPP (e.g., Paging) access; support of authentication of UEs connected over N3IWF/TNGF; management of mobility, authentication, and separate security context state(s) of a UE connected via a non-3 GPP access or connected via a 3 GPP access and a non-3 GPP access simultaneously; support a coordinated RM management context valid over a 3 GPP access and a Non 3 GPP access; and/or support dedicated CM management contexts for the UE for connectivity over non-3 GPP access. Not all of the above functionalities may be required to be supported in an instance of a Network Slice.

The SMF 422 supports Session Management (e.g., Session Establishment, modify and release, including tunnel maintain between UPF and AN node), UE IP address allocation management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations. 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5 GS Optimization, header compression, acting as I-SMF in deployments where 1-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 422 may include policy related functionalities.

The SCP 424 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 424 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 416 may include a device with radio communication capabilities. For example, the UE 416 may comprise a smartphone (e.g., handheld touchscreen mobile computing devices connectable to one or more cellular networks). The UE 416 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 416 may comprise an IDT UE, which can comprise a network access layer designed for low-power IoT applications utilizing short-lived UE connections. An IoT UE can utilize technologies (e.g., M2M, MTC, or mMTC technology) for exchanging data with an MTC server Or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 416 may be configured to connect or communicatively couple with the (R)AN 406 through a radio interface 430, which may be a physical communication interface or layer configured to operate with cellular communication protocols such as a GSM protocol, a CDMA network protocol, a Push-to-Talk (PIT) protocol, a PTT over Cellular (POC) protocol, a UMTS protocol, a 3GPP LIE protocol, a 5G protocol, a NR protocol, and the like. For example, the LIE 416 and the (R)AN 406 may use a Uu interface (e.g., an LTE-Uu interface) to exchange control plane data via a protocol stack comprising a PITY layer, a MAC layer, an RLC layer, a PDCP layer, and an RRC layer. A DL transmission may be from the (R)AN 406 to the UE 416 and a UL transmission may be from the UE 416 to the (R)AN 406. The UE 416 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 406 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 406 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A ferntocell may cover a relatively small geographic area (e.g., a home) and may allow restricted access by UEs having an association with the femtocell UEs in a Closed Subscriber Group (CSG), UEs for users in the home, etc.).

Although not shown, multiple RAN nodes (such as the (R)AN 406) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 416 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 402 may act as an anchor point for intra-RAT and inter-RAT mobility, an external PDU session point of interconnect to the DN 404, and a branching point to support multi-homed PDU session. The UPF 402 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 402 may include an uplink classifier to support routing traffic flows to a data network. The DN 404 may represent various network operator services, Internet access, or third party services. The DN 404 may include, for example, an application server.

Figure 5:
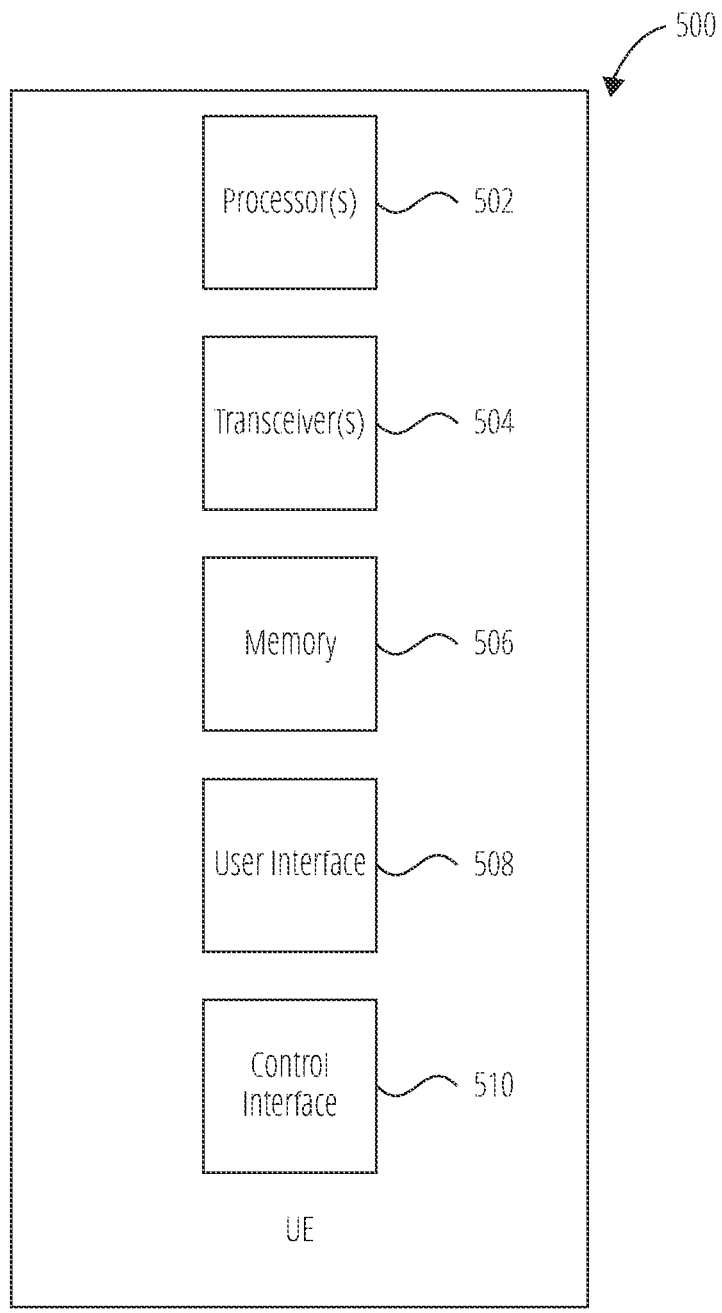
FIG. 5 illustrates a UE in accordance with one embodiment.

FIG. 5 is a block diagram of an example UL. 500 configurable according to various embodiments of the present disclosure, including by execution of instructions on a computer-readable medium that correspond to any of the example methods and/or procedures described herein. The UE 500 comprises one or more processor 502, transceiver 504, memory 506, user interface 508, and control interface 510.

The one or more processor 502 may include, for example, an application processor, an audio digital signal processor, a central processing unit, and/or one or more baseband processors. Each of the one or more processor 502 may include internal memory and/or may include interface(s) to communication with external memory (including the memory 506). The internal or external memory can store software code, programs, and/or instructions for execution by the one or more processor 502 to configure and/or facilitate the UE 500 to perform various operations, including operations described herein. For example, execution of the instructions can configure the UE 500 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 504, user interface 508, and/or control interface 510. As another example, the one or more processor 502 may execute program code stored in the memory 506 or other memory that corresponds to MAC, RLC, PDCP, and RRC layer protocols standardized by 3GPP (e.g., for NR and/or LTE). As a further example, the processor 502 may execute program code stored in the memory 506 or other memory that, together with the one or more transceiver 504, implements corresponding PRY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 506 may comprise memory area for the one or more processor 502 to store variables used in protocols, configuration, control, and other functions of the UE 500, including operations corresponding to, or comprising, any of the example methods and/or procedures described herein. Moreover, the memory 506 may comprise non-volatile memory (e.g., flash memory), volatile memory (e.g., static or dynamic RAM), or a combination thereof. Furthermore, the memory 506 may interface with a memory slot by which removable memory cards in one or more formats e.g., SD Card, Memory Stick, Compact Flash, etc.)) can be inserted and removed.

The one or more transceiver 504 may include radio-frequency transmitter and/or receiver circuitry that facilitates the UE 500 to communicate with other equipment supporting like wireless communication standards and/or protocols. For example, the one or more transceiver 504 may include switches, mixer circuitry, amplifier circuitry, filter circuitry, and synthesizer circuitry. Such RE circuitry may include a receive signal path with circuitry to down-convert RE signals received from a front-end module (FEM) and provide baseband signals to a baseband processor of the one or more processor 502. The RE circuitry may also include a transmit signal path which may include circuitry to up-convert baseband signals provided by a baseband processor and provide RF output signals to the HEM for transmission, The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the ITEM circuitry may include a TX/RX switch to switch between transmit mode and receive mode operation.

In some exemplary embodiments, the one or more transceiver 504 includes a transmitter and a receiver that enable device 1200 to communicate with various 5G/NR networks according to various protocols and/or methods proposed for standardization by 3GPP and/or other standards bodies. For example, such functionality can operate cooperatively with the one or more processor 502 to implement a PHY layer based on OFDM, OFDMA, and/or SC-FDMA technologies, such as described herein with respect to other figures.

The user interface 508 may take various forms depending on particular embodiments, or can be absent from the UE 500. In some embodiments, the user interface 508 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 500 may comprise a tablet computing device including a larger touchscreen display. In such embodiments, one or more of the mechanical features of the user interface 508 may be replaced by comparable or functionally equivalent virtual user interface features (e.g., virtual keypad, virtual buttons, etc.) implemented using the touchscreen display, as familiar to persons of ordinary skill in the art. In other embodiments, the UE 500 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 500 having a touch screen display are capable of receiving user inputs, such as inputs related to exemplary methods and/or procedures described herein or otherwise known to persons of ordinary skill in the art.

In some exemplary embodiments of the present disclosure, the UE 500 may include an orientation sensor, which can be used in various ways by features and functions of the UE 500. For example, the UE 500 can use outputs of the orientation sensor to determine when a user has changed the physical orientation of the UE 500's touch screen display. An indication signal from the orientation sensor can be available to any application program executing on the UE 500, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 510 may take various forms depending on particular embodiments. For example, the control interface 510 may include an RS-232 interface, an RS-485 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1260 can comprise an IEEE 802.3 Ethernet interface such as described above. In some embodiments of the present disclosure, the control interface 510 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 500 may include more functionality than is shown in FIG. 5 including, for example, a video and/or still-image camera, microphone, media player and/or recorder, etc. Moreover, the one or more transceiver 504 may include circuitry for communication using additional radio-frequency communication standards including Bluetooth. GPS, and/or others. Moreover, the one or more processor 502 may execute software code stored in the memory 506 to control such additional functionality. For example, directional velocity and/or position estimates output from a GPS receiver can be available to any application program executing on the UE 500, including various exemplary methods and/or computer-readable media according to various exemplary embodiments of the present disclosure.

Figure 6:
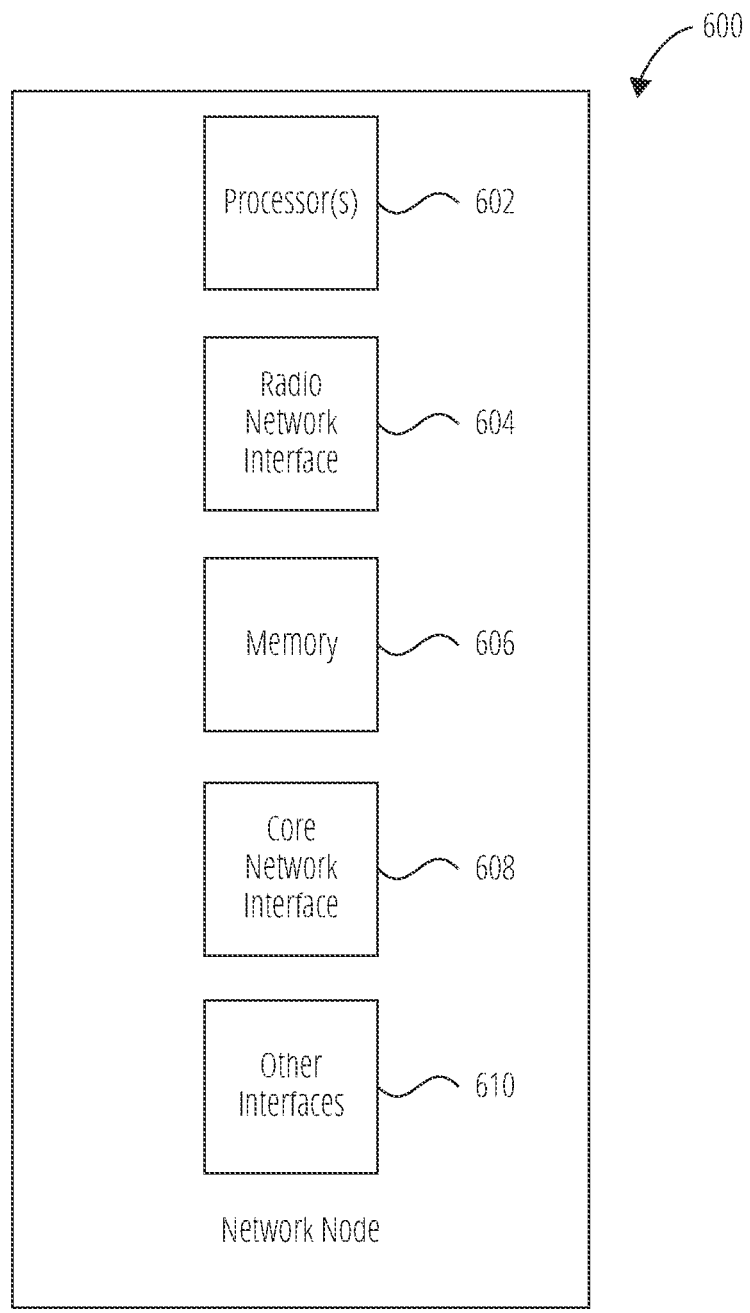
FIG. 6 illustrates a network node in accordance with one embodiment.

FIG. 6 is a block diagram of an example network node 600 configurable according to various embodiments of the present disclosure, including by execution of instructions on a computer-readable medium that correspond to any of the example methods and/or procedures described herein.

The network node 600 includes a one or more processor 602, a radio network interface 604, a memory 606, a core network interface 608, and other interfaces 610. The network node 600 may comprise, for example, a base station, eNB, gNB, access node, or component thereof.

The one or more processor 602 may include any type of processor or processing circuitry and may be configured to perform an of the methods or procedures disclosed herein. The memory 606 may store software code, programs, and/or instructions executed by the one or more processor 602 to configure the network node 600 to perform various operations, including operations described herein. For example, execution of such stored instructions can configure the network node 600 to communicate with one or more other devices using protocols according to various embodiments of the present disclosure, including one or more methods and/or procedures discussed above. Furthermore, execution of such stored instructions can also configure and/or facilitate the network node 600 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 604 and the core network interface 608. By way of example and without limitation, the core network interface 608 comprise an S1 interface and the radio network interface 604 may comprise a Un interface, as standardized by 3GPP. The memory 606 may also store variables used in protocols, configuration, control, and other functions of the network node 600. As such, the memory 606 may comprise non-volatile memory (e.g., flash memory, hard disk, etc.), volatile memory (e.g., static or dynamic RAM), network-based (e.g., "cloud") storage, or a combination thereof.

The radio network interface 604 may include transmitters, receivers, signal processors, ASICs, antennas, beamforming units, and other circuitry that enables network node 600 to communicate with other equipment such as, in some embodiments, a plurality of compatible user equipment (UE). In some embodiments, the network node 600 may include various protocols or protocol layers, such as the PRY MAC, RLC, PDCP, and RRC layer protocols standardized by 3GPP for LTE, LTE-A, and/or 5G/NR. According to further embodiments of the present disclosure, the radio network interface 604 may include a PHY layer based on OFDM, OFDMA, and/or SC-FDMA technologies. In some embodiments, the functionality of such a PHY layer can be provided cooperatively by the radio network interface 604 and the one or more processor 602.

The core network interface 608 may include transmitters, receivers, and other circuitry that enables the network node 600 to communicate with other equipment in a core network such as, in some embodiments, circuit-switched (CS) and/or packet-switched Core (PS) networks. In some embodiments, the core network interface 608 may include the S1 interface standardized by 3GPP. In some embodiments, the core network interface 608 may include one or more interfaces to one or more SGWs, MMES, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 608 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 610 may include transmitters, receivers, and other circuitry that enables the network node 600 to communicate with external networks, computers, databases, and the like for purposes of operations, administration, and maintenance of the network node 600 or other network equipment operably connected thereto.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1A may include an apparatus comprising means to perform one or more elements of a method described in or related to any of the methods or processes described herein.

Example 2A may include one or more non-transitory computer-readable media comprising instructions to cause an electronic device, upon execution of the instructions by one or more processors of the electronic device, to perform one or more elements of a method described in or related to any of the above. Examples, or any other method or process described herein.

Example 3A may include an apparatus comprising logic, modules, or circuitry to perform one or more elements of a method described in or related to any of the above Examples, or any other method or process described herein.

Example 4A may include a method, technique, or process as described in or related to any of the above Examples, or portions or parts thereof, Example 5A may include an apparatus comprising: one or more processors and one or more computer-readable media comprising instructions that, when executed by the one or more processors, cause the one or more processors to perform the method, techniques, or process as described in or related to any of the above Examples, or portions thereof, Example 6A may include a signal as described in or related to any of the above Examples, or portions or parts thereof.

Example 7A may include a datagram, packet, frame, segment, protocol data unit (PM), or message as described in or related to any of the above Examples, or portions or parts thereof, or otherwise described in the present disclosure.

Example 8A may include a signal encoded with data as described in or related to any of the above Examples, or portions or parts thereof, or otherwise described in the present disclosure.

Example 9A may include a signal encoded with a datagram, packet, frame, segment, PDU, or message as described in or related to any of the above Examples, or portions or parts thereof, or otherwise described in the present disclosure.

Example 10A may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11A may include a computer program comprising instructions, wherein execution of the program by a processing element is to cause the processing element to carry out the method, techniques, or process as described in or related to any of the above Examples, or portions thereof.

Example 12A may include a signal in a wireless network as shown and described herein.

Example 13A may include a method of communicating in a wireless network as shown and described herein.

Example 14A may include a system for providing wireless communication as shown and described herein.

Example 15A may include a device for providing wireless communication as shown and described herein.

Example 1B. A method for a user equipment (UE), comprising: decoding a system information block from a network node; determining whether a Synchronization Signal Block (SSB)-based Measurement Timing Configuration (smtc) information element is present in the system information block, and whether an smtc2-long period (LP) information element is present in the system information block; determining whether to use the smtc information element or the smtc2-LP information element to calculate timing of a first measurement period to evaluate a serving cell while the UE is in idle mode or inactive mode; determining whether to use the smtc information element or the smtc2-LP information element to calculate timing of a second measurement period to evaluate intra-frequency cells while the UE is in idle mode or inactive mode; measuring Synchronization Signal based Reference Signal Received Power (SS-RSRP) level and Synchronization Signal based Reference Signal Received Quality (SS-RSRQ) level of the serving cell during the first measurement period; and measuring SS-RSRP level and SS-RSRQ level of the intra-frequency cells during the second measurement period.

Example 2B. The method of example 1B, wherein the smtc2-LP information element comprises a Physical Cell identity (pci)-List and a periodicity.

Example 3B. The method of example 1B, wherein to calculate timing of the first measurement period for an intra-frequency carrier: when the system information block includes the smtc2-LP information element on the intra-frequency carrier, a smtc periodicity ($T_{SMTC}$) is determined using the smtc2-LP information element; and when the system information block does not include the smtc2-LP information element, the $T_{SMTC}$ is determined using the smtc information element.

Example 4B. The method of example 1B, wherein to calculate timing of the first measurement period for an intra-frequency carrier, a $T_{SMTC}$ is determined using the smtc information element no matter whether the system information block includes smtc2-LP information element on the intra-frequency carrier or not.

Example 5B. The method of example 1B, wherein to calculate timing of the first measurement period for an intra-frequency carrier: when the system information block includes the smtc2-LP information element on the intra-frequency carrier and serving cell is in a pci-List of the smtc2-LP information element, a $T_{SMTC}$ is determined using smtc2-LP information element; and when the system information block does not include the smtc2-LP information element, the $T_{SMTC}$ is determined using the smtc information element.

Example 6B. The method of example 1B, wherein to calculate timing of the first measurement period for an intra-frequency carrier: when the system information block includes the smtc2-LP information element on the intra-frequency carrier and at least one of the intra-frequency cells is in a pci-List of the smtc2-LP information element, a $T_{SMTC}$ is determined using smtc2-LP information element: and when the system information block does not include the smtc2-LP information element, the $T_{SMTC}$ is determined using the smtc information element.

Example 7B. The method of example 1B, wherein to calculate timing of the second measurement period for an intra-frequency carrier: when the system information block includes the smtc2-LP information element on the intra-frequency carrier, a $T_{SMTC}$ is determined using the smtc2-LP information element; and when the system information block does not include the smtc2-LP information element, the $T_{SMTC}$ is determined using the smtc information element.

Example 8B. The method of example 1B, wherein to calculate timing of the second measurement period for an intra-frequency carrier, a $T_{SMTC}$ is determined using the smtc information element no matter whether the system information block includes smtc2-LP information element on the intra-frequency carrier or not.

Example 9B. The method of example 1B, wherein to calculate the second measurement period for an intra-frequency carrier: when the system information block includes the smtc2-LP information element on the intra-frequency carrier and a target intra-frequency cell is in a pci-List of the smtc2-LP information element, a $T_{SMTC}$ is determined using smtc2-LP; and when the system information block does not include the smtc2-LP information element, the $T_{SMTC}$ is determined using the smtc information element.

Example 10B. A non-transitory computer-readable storage medium, the computer-readable storage medium including instructions that, when executed by a UE, cause the UE to: decode a system information block from a network node; determine whether a Synchronization Signal Block (SSB)-based Measurement Timing Configuration (smtc) information element is present in the system information block; and whether an smtc2-long period (LP) information element is present in the system information block; determine whether to use the smtc information element or the smtc2-LP information element for a smtc periodicity ($T_{SMTC}$) to determine a scaling factor; determine timing of a measurement period to evaluate a serving cell while the UE is in idle mode or inactive mode using the scaling factor; and measure Synchronization Signal based Reference Signal Received Power (SS-RSRP) level and Synchronization Signal based Reference Signal Received Quality (SS-RSRQ) level of the serving cell during the measurement period.

Example 11B. The non-transitory computer-readable storage medium of example 10B, wherein when the system information block includes the smtc2-LP information element on the intra-frequency carrier, the smtc periodicity ($T_{SMTC}$) is determined using the smtc2-LP information element; and when the system information block does not include the smtc2-LP information element, the $T_{SMTC}$ is determined using the smtc information element.

Example 12B. The non-transitory computer-readable storage medium of example 10B, wherein the $T_{SMTC}$ is determined using the smtc information element no matter whether the system information block includes smtc2-LP information element on the intra-frequency carrier or not.

Example 13B. The non-transitory computer-readable storage medium of example 10B, wherein when the system information block includes the smtc2-LP information element on an intra-frequency carrier and serving cell is in a pci-List of the smtc2-LP information element, the $T_{SMTC}$ is determined using smtc2-LP information element; and when the system information block does not include the smtc2-LP information element, the $T_{SMTC}$ is determined using the smtc information element.

Example 14B. The non-transitory computer-readable storage medium of example 10B, wherein when the system information block includes the smtc2-LP information element on an intra-frequency carrier and at least one of the intra-frequency cells is in a pci-List of the smtc2-LP information element, the $T_{SMTC}$ is determined using smtc2-LP information element; and when the system information block does not include the smtc2-LP information element, the $T_{SMTC}$ is determined using the smtc information element.

Example 15B. The non-transitory computer-readable storage medium of example 10B the instructions further to cause the UE to: determine whether to use the smtc information element or the smtc2-LP information element to calculate a second measurement period to evaluate intra-frequency cells while the UE is in idle mode or inactive mode; and measure SS-RSRP level and SS-RSRQ level of the intra-frequency cells during the second measurement period.

Example 16. An apparatus for use in a user equipment (UE), the apparatus comprising: a baseband processing unit; and a memory storing instructions that, when executed by the baseband processing unit, cause the apparatus to: decode a system information block from a network node; determine whether a Synchronization Signal Block (SSB)-based Measurement Timing Configuration (smtc) information element is present in the system information block, and whether an smtc2-long period (LP) information element is present in the system information block; determine whether to use the smtc information element or the smtc2-LP information element for a smtc periodicity ($T_{SMTC}$) to deem mine a scaling factor; determine timing of a measurement period to evaluate intra-frequency cells while the UE is in idle mode or inactive mode using the scaling factor; and measure Synchronization Signal based Reference Signal. Received Power (SS-RSRP) level and Synchronization Signal based Reference Signal Received Quality (SS-RSRQ) level of the intra-frequency cells during the measurement period.

Example 17B. The apparatus of example 16B, wherein when the system information block includes the smtc2-LP information element on an intra-frequency carrier, the $T_{SMTC}$ is determined using the smtc2-LP information element; and when the system information block does not include the smtc2-LP information element, the $T_{SMTC}$ is determined using the smtc information element.

Example 18B. The apparatus of example 16B, wherein the $T_{SMTC}$ is determined using the smtc information element no matter whether the system information block includes smtc2-LP information element on the intra-frequency carrier or not.

Example 19B. The apparatus of example 16B, wherein when the system information block includes the smtc2-LP information element on an intra-frequency carrier and a target intra-frequency cell is in a pci-List of the smtc2-LP information element, a $T_{SMTC}$ is determined using smtc2-LP information element; and when the system information block does not include the smtc2-LP information element, the $T_{SMTC}$ is determined using the smtc information element.

Example 20B. The apparatus of example 16B, the instructions further to cause the LIE to: determine whether to use the smtc information element or the smtc2-LP information element to calculate a second measurement period to evaluate a serving cell while the UE is in idle mode or inactive mode; and measure SS-RSRP level and SS-RSRQ level of the serving cell during the second measurement period.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a user equipment (UE), comprising:
   decoding a system information block from a network node;
   determining whether a Synchronization Signal Block (SSB)-based Measurement Timing Configuration (smtc) information element is present in the system information block, and whether an smtc2-long period (LP) information element is present in the system information block, wherein a first periodicity in the smtc2-LP information element is set to a value larger than a second periodicity in the smtc information element;
   determining whether to use the smtc information element or the smtc2-LP information element to calculate timing of a first measurement period to evaluate a serving cell while the UE is in idle mode or inactive mode;
   determining whether to use the smtc information element or the smtc2-LP information element to calculate timing of a second measurement period to evaluate intra-frequency cells while the UE is in idle mode or inactive mode;
   measuring Synchronization Signal based Reference Signal Received Power (SS-RSRP) level and Synchronization Signal based Reference Signal Received Quality (SS-RSRQ) level of the serving cell during the first measurement period; and
   measuring SS-RSRP level and SS-RSRQ level of the intra-frequency cells during the second measurement period.

2. The method of claim 1, wherein the smtc2-LP information element comprises a Physical Cell Identity (pci)-List and a periodicity.

3. The method of claim 1, wherein to calculate timing of the first measurement period for an intra-frequency carrier:
when the system information block includes the smtc2-LP information element on the intra-frequency carrier, a smtc periodicity ($T_{SMTC}$) is determined using the smtc2-LP information element; and
when the system information block does not include the smtc2-LP information element, the $T_{SMTC}$ is determined using the smtc information element.

4. The method of claim 1, wherein to calculate timing of the first measurement period for an intra-frequency carrier, a $T_{SMTC}$ is determined using the smtc information element no matter whether the system information block includes smtc2-LP information element on the intra-frequency carrier or not.

5. The method of claim 1, wherein to calculate timing of the first measurement period for an intra-frequency carrier:
when the system information block includes the smtc2-LP information element on the intra-frequency carrier and serving cell is in a pci-List of the smtc2-LP information element, a $T_{SMTC}$ is determined using smtc2-LP information element; and
when the system information block does not include the smtc2-LP information element, the $T_{SMTC}$ is determined using the smtc information element.

6. The method of claim 1, wherein to calculate timing of the first measurement period for an intra-frequency carrier:
when the system information block includes the smtc2-LP information element on the intra-frequency carrier and at least one of the intra-frequency cells is in a pci-List of the smtc2-LP information element, a $T_{SMTC}$ is determined using smtc2-LP information element; and
when the system information block does not include the smtc2-LP information element, the $T_{SMTC}$ is determined using the smtc information element.

7. The method of claim 1, wherein to calculate timing of the second measurement period for an intra-frequency carrier:
when the system information block includes the smtc2-LP information element on the intra-frequency carrier, a $T_{SMTC}$ is determined using the smtc2-LP information element; and
when the system information block does not include the smtc2-LP information element, the $T_{SMTC}$ is determined using the smtc information element.

8. The method of claim 1, wherein to calculate timing of the second measurement period for an intra-frequency carrier, a $T_{SMTC}$ is determined using the smtc information element no matter whether the system information block includes smtc2-LP information element on the intra-frequency carrier or not.

9. The method of claim 1, wherein to calculate the second measurement period for an intra-frequency carrier:
when the system information block includes the smtc2-LP information element on the intra-frequency carrier and a target intra-frequency cell is in a pci-List of the smtc2-LP information element, a $T_{SMTC}$ is determined using smtc2-LP; and
when the system information block does not include the smtc2-LP information element, the $T_{SMTC}$ is determined using the smtc information element.

10. A non-transitory computer-readable storage medium, the computer-readable storage medium including instructions that, when executed by a UE, cause the UE to:
decode a system information block from a network node;
determine whether a Synchronization Signal Block (SSB)-based Measurement Timing Configuration (smtc) information element is present in the system information block, and whether an smtc2-long period (LP) information element is present in the system information block, wherein a first periodicity in the smtc2-LP information element is set to a value larger than a second periodicity in the smtc information element;
determine whether to use the smtc information element or the smtc2-LP information element for a smtc periodicity ($T_{SMTC}$) to determine a scaling factor;
determine timing of a measurement period to evaluate a serving cell while the UE is in idle mode or inactive mode using the scaling factor; and
measure Synchronization Signal based Reference Signal Received Power (SS-RSRP) level and Synchronization Signal based Reference Signal Received Quality (SS-RSRQ) level of the serving cell during the measurement period.

11. The non-transitory computer-readable storage medium of claim 10, wherein when the system information block includes the smtc2-LP information element on an intra-frequency carrier, the smtc periodicity ($T_{SMTC}$) is determined using the smtc2-LP information element; and
when the system information block does not include the smtc2-LP information element, the $T_{SMTC}$ is determined using the smtc information element.

12. The non-transitory computer-readable storage medium of claim 10, wherein the $T_{SMTC}$ is determined using the smtc information element no matter whether the system information block includes smtc2-LP information element on an intra-frequency carrier or not.

13. The non-transitory computer-readable storage medium of claim 10, wherein when the system information block includes the smtc2-LP information element on an intra-frequency carrier and serving cell is in a pci-List of the smtc2-LP information element, the $T_{SMTC}$ is determined using smtc2-LP information element; and
when the system information block does not include the smtc2-LP information element, the $T_{SMTC}$ is determined using the smtc information element.

14. The non-transitory computer-readable storage medium of claim 10, wherein when the system information block includes the smtc2-LP information element on an intra-frequency carrier and at least one of the intra-frequency cells is in a pci-List of the smtc2-LP information element, the $T_{SMTC}$ is determined using smtc2-LP information element; and
when the system information block does not include the smtc2-LP information element, the $T_{SMTC}$ is determined using the smtc information element.

15. The non-transitory computer-readable storage medium of claim 10, the instructions further to cause the UE to:
determine whether to use the smtc information element or the smtc2-LP information element to calculate a second measurement period to evaluate intra-frequency cells while the UE is in idle mode or inactive mode; and
measure SS-RSRP level and SS-RSRQ level of the intra-frequency cells during the second measurement period.

16. An apparatus for use in a user equipment (UE), the apparatus comprising:
a baseband processing unit; and
a memory storing instructions that, when executed by the baseband processing unit, cause the apparatus to:

decode a system information block from a network node;

determine whether a Synchronization Signal Block (SSB)-based Measurement Timing Configuration (smtc) information element is present in the system information block, and whether an smtc2-long period (LP) information element is present in the system information block, wherein a first periodicity in the smtc2-LP information element is set to a value larger than a second periodicity in the smtc information element;

determine whether to use the smtc information element or the smtc2-LP information element for a smtc periodicity ($T_{SMTC}$) to determine a scaling factor;

determine timing of a measurement period to evaluate intra-frequency cells while the UE is in idle mode or inactive mode using the scaling factor; and measure Synchronization Signal based Reference Signal Received Power (SS-RSRP) level and Synchronization Signal based Reference Signal Received Quality (SS-RSRQ) level of the intra-frequency cells during the measurement period.

17. The apparatus of claim 16, wherein when the system information block includes the smtc2-LP information element on an intra-frequency carrier, the $T_{SMTC}$ is determined using the smtc2-LP information element; and when the system information block does not include the smtc2-LP information element, the $T_{SMTC}$ is determined using the smtc information element.

18. The apparatus of claim 16, wherein the $T_{SMTC}$ is determined using the smtc information element no matter whether the system information block includes smtc2-LP information element on the intra-frequency carrier or not.

19. The apparatus of claim 16, wherein when the system information block includes the smtc2-LP information element on an intra-frequency carrier and a target intra-frequency cell is in a pci-List of the smtc2-LP information element, a $T_{SMTC}$ is determined using smtc2-LP information element; and when the system information block does not include the smtc2-LP information element, the $T_{SMTC}$ is determined using the smtc information element.

20. The apparatus of claim 16, the instructions further to cause the UE to:

determine whether to use the smtc information element or the smtc2-LP information element to calculate a second measurement period to evaluate a serving cell while the UE is in idle mode or inactive mode; and measure SS-RSRP level and SS-RSRQ level of the serving cell during the second measurement period.

* * * * *